US010261301B2

(12) United States Patent
Okamoto

(10) Patent No.: US 10,261,301 B2
(45) Date of Patent: Apr. 16, 2019

(54) PHOTOGRAPHING CONTROL DEVICE, MICROSCOPE AND PROGRAM

(71) Applicant: NIKON CORPORATION, Tokyo (JP)

(72) Inventor: Takaaki Okamoto, Fujisawa (JP)

(73) Assignee: NIKON CORPORATION, Tokyo (JP)

( * ) Notice: Subject to any disclaimer, the term of this patent is extended or adjusted under 35 U.S.C. 154(b) by 202 days.

(21) Appl. No.: 15/193,690

(22) Filed: Jun. 27, 2016

(65) Prior Publication Data
US 2016/0306153 A1    Oct. 20, 2016

Related U.S. Application Data

(63) Continuation of application No. 12/452,386, filed as application No. PCT/JP2008/064964 on Aug. 22, 2008, now Pat. No. 9,395,528.

(30) Foreign Application Priority Data
Aug. 22, 2007  (JP) ................................ 2007-215987

(51) Int. Cl.
H04N 7/18          (2006.01)
G02B 21/00         (2006.01)
(Continued)

(52) U.S. Cl.
CPC ....... G02B 21/0088 (2013.01); G02B 21/245 (2013.01); G02B 21/367 (2013.01);
(Continued)

(58) Field of Classification Search
CPC .............. G02B 21/0088; G02B 21/245; G02B 21/367; H04N 5/232; H04N 5/23245; H04N 5/23293; H04N 5/2352
(Continued)

(56) References Cited

U.S. PATENT DOCUMENTS 5,580,744 A    12/1996  Zweig
5,652,919 A *  7/1997  Itoh ......................... G03B 5/00
                                                       396/55
(Continued)

FOREIGN PATENT DOCUMENTS

JP    2002-277754 A    9/2002
JP    2006-195274 A    7/2006
(Continued)

OTHER PUBLICATIONS

Jul. 31, 2012 Search Report issued in European Patent Application No. 08792635.8.
(Continued)

Primary Examiner — Anand S Rao
(74) Attorney, Agent, or Firm — Oliff PLC

(57) ABSTRACT

Disclosed is a photographing control device, microscope and program that can simply confirm whether time lapse photography is being executed normally or not. A photographing control unit may control an operation of each apparatus of the microscope that performs processing related to the time lapse photography, in an execution mode for executing the time lapse photography, and a test mode for confirming an operation of the time lapse photography before the execution mode. The photographing control unit may also control the operation of each apparatus of the microscope in the execution mode according to information acquired in the test mode.

10 Claims, 11 Drawing Sheets

(51) Int. Cl.
*G02B 21/36* (2006.01)
*H04N 5/232* (2006.01)
*H04N 5/235* (2006.01)
*G02B 21/24* (2006.01)

(52) U.S. Cl.
CPC .......... *H04N 5/232* (2013.01); *H04N 5/2352* (2013.01); *H04N 5/23245* (2013.01); *H04N 5/23293* (2013.01)

(58) Field of Classification Search
USPC .......................................................... 348/79
See application file for complete search history.

(56) References Cited

U.S. PATENT DOCUMENTS

| | | | | |
|---|---|---|---|---|
| 5,905,920 | A * | 5/1999 | Hasuda | G03B 9/18 396/273 |
| 7,432,959 | B2 * | 10/2008 | Ueda | G01N 21/6458 348/221.1 |
| 2004/0181343 | A1 | 9/2004 | Wigstrom et al. | |
| 2004/0196365 | A1 | 10/2004 | Green et al. | |
| 2005/0152029 | A1 | 7/2005 | Endo | |
| 2005/0170332 | A1 | 8/2005 | Shimamoto | |
| 2006/0171023 | A1 | 8/2006 | Kishida | |
| 2006/0190750 | A1 | 8/2006 | Maggi et al. | |
| 2006/0210262 | A1 | 9/2006 | Fujiyoshi et al. | |
| 2007/0126866 | A1 | 6/2007 | Uchida | |

FOREIGN PATENT DOCUMENTS

| | | |
|---|---|---|
| JP | 2006-350004 A | 12/2006 |
| JP | 2006-350005 A | 12/2006 |
| JP | 2007-158506 A | 6/2007 |
| JP | 2008-257065 A | 10/2008 |
| WO | 99/11053 A1 | 3/1999 |

OTHER PUBLICATIONS

Aug. 16, 2012 Office Action issued in Japanese Patent Application No. 2009-529069.
Nov. 25, 2008 Search Report issued in International Patent Application No. PCT/JP2008/064964.
Feb. 17, 2013 Office Action issued in U.S. Appl. No. 12/452,386.
May 9, 2012 Office Action issued in U.S. Appl. No. 12/452,386.
Sep. 21, 2015 Office Action issued in U.S. Appl. No. 12/452,386.
Dec. 8, 2014 Office Action issued in U.S. Appl. No. 12/452,386.

* cited by examiner

CURRENT POSITION

311 — | 770.3 | 658.2 | 0.15 |

( REGISTER ) — 312

| X POSITION | Y POSITION | Z POSITION |
|---|---|---|
| 120.1 | 130.1 | 0.05 |
| 420.7 | 125.6 | 0.20 |
| 150.5 | 315.8 | 0.10 |
| 130.1 | 130.4 | 0.05 |
| 770.3 | 658.2 | 0.15 |
|  |  |  |

CURRENT STATE

| | | |
|---|---|---|
| NONE | TRANSMIT | CAMERA B |

(REGISTER) —332

| FILTER | ILLUMINATION | CAMERA |
|---|---|---|
| UV | FLUORESCENT | CAMERA A |
| G | FLUORESCENT | CAMERA A |
| NONE | TRANSMIT | CAMERA B |
| | | |
| | | |

FIG 9

SEQUENCE

| DEVICE | OPERATION | CONDITIONS |
|---|---|---|
| XY | SHIFT | — |
| Z | SHIFT | — |
| AF | EXECUTE | AFTER COMPLETION OF PREVIOUS OPERATION |
| FILTER | ROTATE | — |
| ILLUMINATION | SWITCH | AFTER COMPLETION OF ALL OPERATIONS |

PHOTOGRAPHING CONTROL DEVICE, MICROSCOPE AND PROGRAM

CROSS-REFERENCE TO RELATED APPLICATIONS

This is a Continuation of application Ser. No. 12/452,386 filed Dec. 29, 2009, which in turn is a National Phase of International Patent Application No. PCT/JP2008/064964 filed Aug. 22, 2008, which claims the benefit of Japanese Patent Application No. 2007-215987 filed Aug. 22, 2007. The disclosure of the prior applications is hereby incorporated by reference herein in its entirety.

TECHNICAL FIELD

The present invention relates to a photographing control device, microscope and program, and more particularly to a photographing control device, microscope and program that allow to easily check the state of a time lapse photography operation.

BACKGROUND ART

One experiment method for observing a sample using a microscope is photographing microscopic images at a pre-determined interval (hereafter referred to as "time lapse photography"), reproducing a series of photographed images after photographing completes, and observing the change of the state of the sample in a time series as a moving image (hereafter referred to as "time lapse photography experiment") (e.g. see Patent Document 1). The time lapse photography experiment method is extremely effective as an experiment method to observe the change of a live cell in a time series, for example.

[Patent Document 1] Japanese Patent Application Laid-Open No. 2002-277754

The time lapse photography experiment, however, extends over a long period of time (e.g. several hours). If the experiment must be started over again due to an incorrect procedure of the experiment, due to an apparatus not operating normally or due to the shift of the photographing position, the loss of time that this error generates is critical. Hence it is necessary to check whether photographing is progressing normally without generating a problem. But the conventional operation of each apparatus and inter-connection among apparatuses must be visually confirmed to verify the normal execution of time lapse photography, which is time consuming, and during which it is easy to overlook an abnormality.

DISCLOSURE OF THE INVENTION

With the foregoing in view, it is an object of the present invention to easily confirm whether time lapse photography is being executed normally or not.

A photographing control device according to a first aspect of the present invention is a photographing control device for controlling time lapse photography using a microscope, comprising: photographing control unit to control an operation of each apparatus of the microscope that performs processing related to the time lapse photography, in an execution mode for executing the time lapse photography, and a test mode for confirming an operation of the time lapse photography before the execution mode. The photographing control unit controls the operation of each apparatus of the microscope in the execution mode according to information acquired in the test mode.

A microscope according to a second aspect of the present invention is a microscope that can execute time lapse photography, comprising: photographing control unit to control an operation of each apparatus of the microscope that performs processing related to the time lapse photography, in an execution mode for executing the time lapse photography, and a test mode for confirming an operation of the time lapse photography before the execution mode. The photographing control unit controls the operation of each apparatus of said microscope in the execution mode according to information acquired in the test mode.

A program according to a first aspect of the present invention is a program for causing a computer to execute processing to control time lapse photography using a microscope, the program causing the computer to execute processing comprising: a photographing control step of controlling an operation of each apparatus of said microscope that performs processing related to the time lapse photography, in an execution mode for executing the time lapse photography, and a test mode for confirming an operation of the time lapse photography before the execution mode and controlling the operation of each apparatus of the microscope in the execution mode according to information acquired in the test mode.

According to the first aspect or the second aspect of the present invention, an exposure time of the camera in the test mode can be shorter than an exposure time of the camera in the execution mode.

According to the first or second aspect, the monitoring result of the operation of time lapse photography can be displayed. Particularly, according to the first or second aspect of the present invention, it can be easily confirmed whether time lapse photography is being executed normally.

BRIEF DESCRIPTION OF THE DRAWINGS

FIG. 8 shows an example of an observation condition setting screen;

FIG. 9 shows an example of a shift sequence setting screen;

Figure 1:
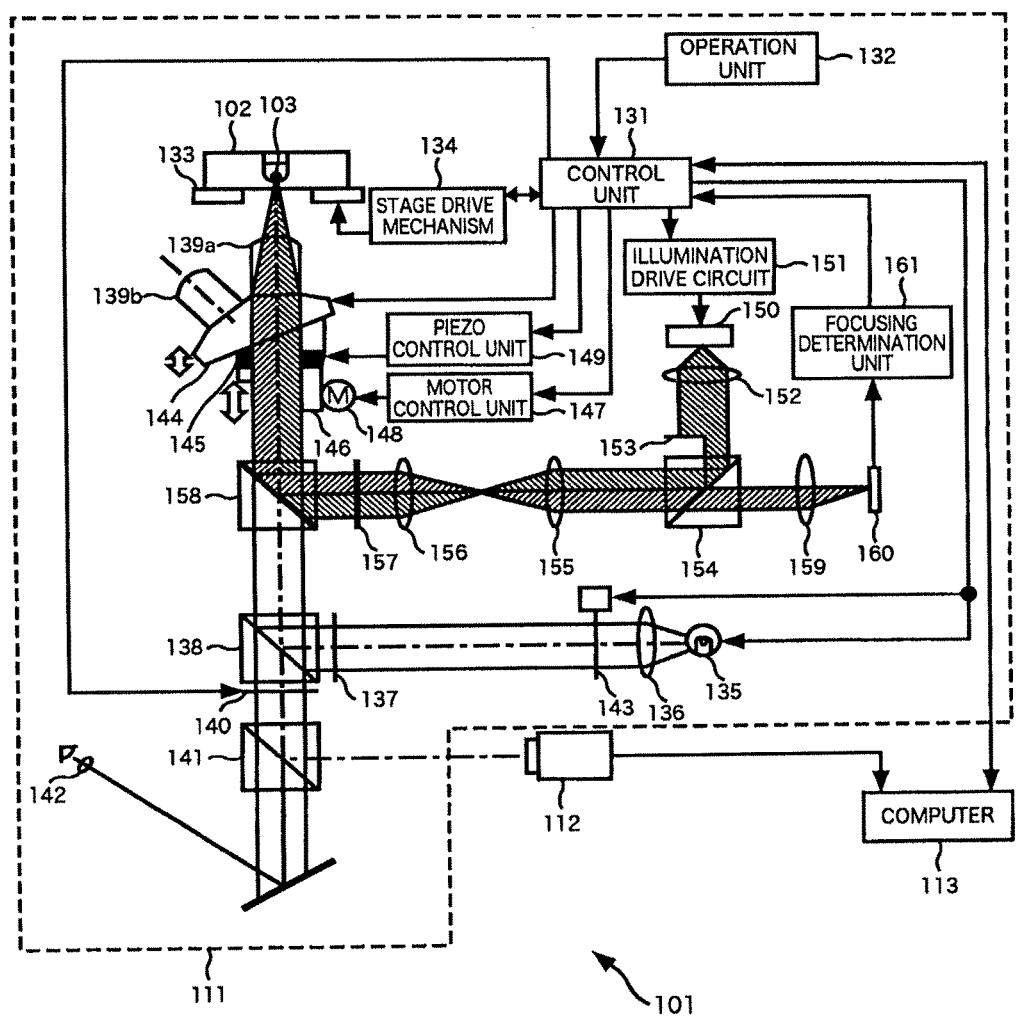
FIG. 1 is a block diagram depicting an embodiment of a time lapse photography experiment system to which the present invention is applied.

EXPLANATION OF REFERENCE NUMERALS 101 time lapse photography experiment system
102 well plate
103 sample
111 inverted microscope
112 camera
113 computer
131 control unit
133 electric stage
134 stage drive mechanism
135 fluorescent light source
139 objective lens
140 absorption filter
144 electric revolver
145 piezo element
146 frame
147 motor control unit
148 focusing motor
149 piezo control unit
150 semiconductor laser
151 illumination drive circuit
160 light receiving sensor
161 focusing determination unit
201 CPU
202 ROM
208 display device
209 storage unit
212 removable media
231 time lapse photographing control unit
241 photographing condition setting unit
242 photographing control unit
243 monitoring unit
244 photographing result display control unit

BEST MODE FOR CARRYING OUT THE INVENTION

Embodiments of the present invention will now be described with reference to the drawings.

FIG. 1 is a block diagram depicting an embodiment of a time lapse photography experiment system to which the present invention is applied. The time lapse photography experiment system 101 in FIG. 1 is a system to perform a time lapse photography experiment on a sample 103, which is a test object, soaked in a solution of each well of a well plate 102 that is installed on an electric stage 133 of an inverted microscope 111, for example. In FIG. 1, only one well is shown on the well plate 102, this for convenience, but in reality a plurality (e.g. 96) of wells are disposed on the well plate 102, and a sample is disposed in each well according to necessity.

The time lapse photography experiment system 101 is constituted by the inverted microscope 111, a camera 112 and a computer 113. The computer 113 is connected to a control unit 131 of the inverted microscope 111 and the camera 112.

The control unit 131 of the inverted microscope 111 includes a CPU (Central Processing Unit), for example. The control unit 131 is connected to an operation unit 132 for inputting various instructions, and controls the operation of each device (apparatus) constituting the inverted microscope 111 based on an instruction that is input via an operation unit 132 and an instruction that is input from the computer 113.

The control unit 131 supplies information to indicate the state of each device constituting the inverted microscope 111 to the computer.

A stage drive mechanism 134 parallel-shifts the electric stage 133 in the X axis direction and Y axis direction, which are directions approximately vertical to the optical axis of the illumination which irradiates onto the sample 103 based on control of the control unit 131. In the following description, it is assumed that the horizontal direction in the drawing is the X axis direction, the vertical direction to the page face is the Y axis direction, and the longitudinal direction (direction of the optical axis of illumination which irradiates the sample 103) in the drawing is the Z axis.

A fluorescent light source 135 is a light source for performing fluorescent illumination on the sample 103. An excitation light emitted from the fluorescent light source 135 is condensed by a collector lens 136, transmits through an excitation filter 137, is reflected in the Z axis direction by a dichroic mirror 138, and irradiates the sample 103 on the electric stage 133 via an objective lens 139a. The fluorescent light emitted from the sample 103 irradiated by the excitation light transmits through the dichroic mirror 138 and an absorption filter 140, and is guided to an ocular 142 or camera 112 by an optical path switching unit 141. An image of the sample 103 captured by the camera 112 (also called "sample image") is supplied to the computer 113.

The computer 113 stores the acquired image in an image memory, which is not illustrated. This image memory can normally store a plurality of images. An electric shutter 143 controls the ON/OFF of excitation light, which is emitted from the fluorescent light source 135 based on the control of the control unit 131.

The excitation filter 137, the dichroic mirror 138 and the absorption filter 140 constitute a plurality of fluorescent filter blocks which correspond to fluorescent lights having a plurality of wavelength bands respectively, and the fluorescent filter block to be used is switched based on the control of the control unit 131. By switching the fluorescent filter block to be used, the wavelength of the fluorescent light from the sample 103, which the camera 112 photographs, can be selected.

An electric revolver 144, to which an objective lens 139a and an objective lens 139b are attached, is secured to a frame 146 via a piezo element 145. The electric revolver 144 rotates based on the control of the control unit 131, and inserts the attached objective lens 139a or objective lens 139b into the optical path.

A motor control unit 147 drives a focusing motor 148 so as to parallel-shift the frame 146 in the Z axis direction based on the control of the control unit 131. Thereby the distance between the sample 103 and the objective lens 139a or objective lens 139b can be adjusted.

A piezo control unit 149 electrically changes the thickness of the piezo element 145 in the Z axis direction based on control of the control unit 131. By this as well, the distance of the sample 103 and the objective lens 139a or objective lens 139b can be adjusted. The piezo element 145 has a drive range that is shorter than the focusing motor 148, but has high-speed and high resolution characteristics.

An illumination drive circuit 151 controls emission of an infrared laser beam from a semiconductor laser 150 based on control of the control unit 131. The laser beam emitted by the semiconductor laser 150 is collimated into parallel rays by a collimate lens 152, and half of the luminous flux diameter is cut by a projection side stopper 153. Then only the P polarization component of a laser beam is reflected by a PBS (Polarization Beam Splitter) 154, is guided to the sample side 103, condensed by a condensing lens group 155, and passes through a chromatic aberration correction lens group 156. The laser beam that passes through the chromatic aberration correction lens group 156 is polarized 45° by a λ/4 plate 157, and only the infrared region of the beam is reflected in the Z axis direction by a dichroic mirror 158, and forms a spot shape image on the bottom face of the well of the well plate 102 by the objective lens 139a.

The laser beam reflected by the well plate 102 passes through the objective lens 139a, and is reflected to the direction of the λ/4 plate 157 by the dichroic mirror 158, and is polarized 45° by the λ/4 plate 157 and switched to the S polarization component. The laser beam then passes through the chromatic aberration correction lens group 156 and the condensing lens group 155, and enters the PBS 154. Since the laser beam is now an S polarization component, the laser beam transmits through PBS 154, and forms an image on a light receiving sensor 160 after passing through a condensing lens group 159.

A focusing determination unit 161 detects the shift of the sample 103 from the focal position based on the sensor signal from the light receiving sensor 160, and supplies the detection result to the control unit 131. Based on the detection result by the focusing determination unit 161, the control unit 131 controls at least one of the motor control unit 147 and the piezo control unit 149, and adjusts the position of the electric revolver 144 in the Z axis direction, so as to cancel the shift of the sample 103 from the focal position. In this way, auto focus is performed.

The computer 113 controls the operation of the inverted microscope 111 and the camera 112. The computer 113 monitors the operation of each apparatus which performs processing related to time lapse photography, such as each device in the inverted microscope 111 and the camera 112, and displays the monitoring result. The computer 113 also acquires the sample image from the camera 112, and displays and stores it.

In FIG. 1, only one camera 112 is shown, but a plurality of cameras can be installed in the time lapse photography experiment system 101 according to the photographing position and application. If a plurality of cameras are installed, a camera to be used is switched based on control of the computer 113.

In FIG. 1, only one fluorescent light source 135 is shown, but a plurality of fluorescent light sources having different wavelengths can be installed, or illumination other than a fluorescent light source (e.g. transmitted illumination) can be used in the inverted microscope 111. If a plurality of illuminations are used, illumination to be used is switched based on control of the control unit 131.

Figure 2:
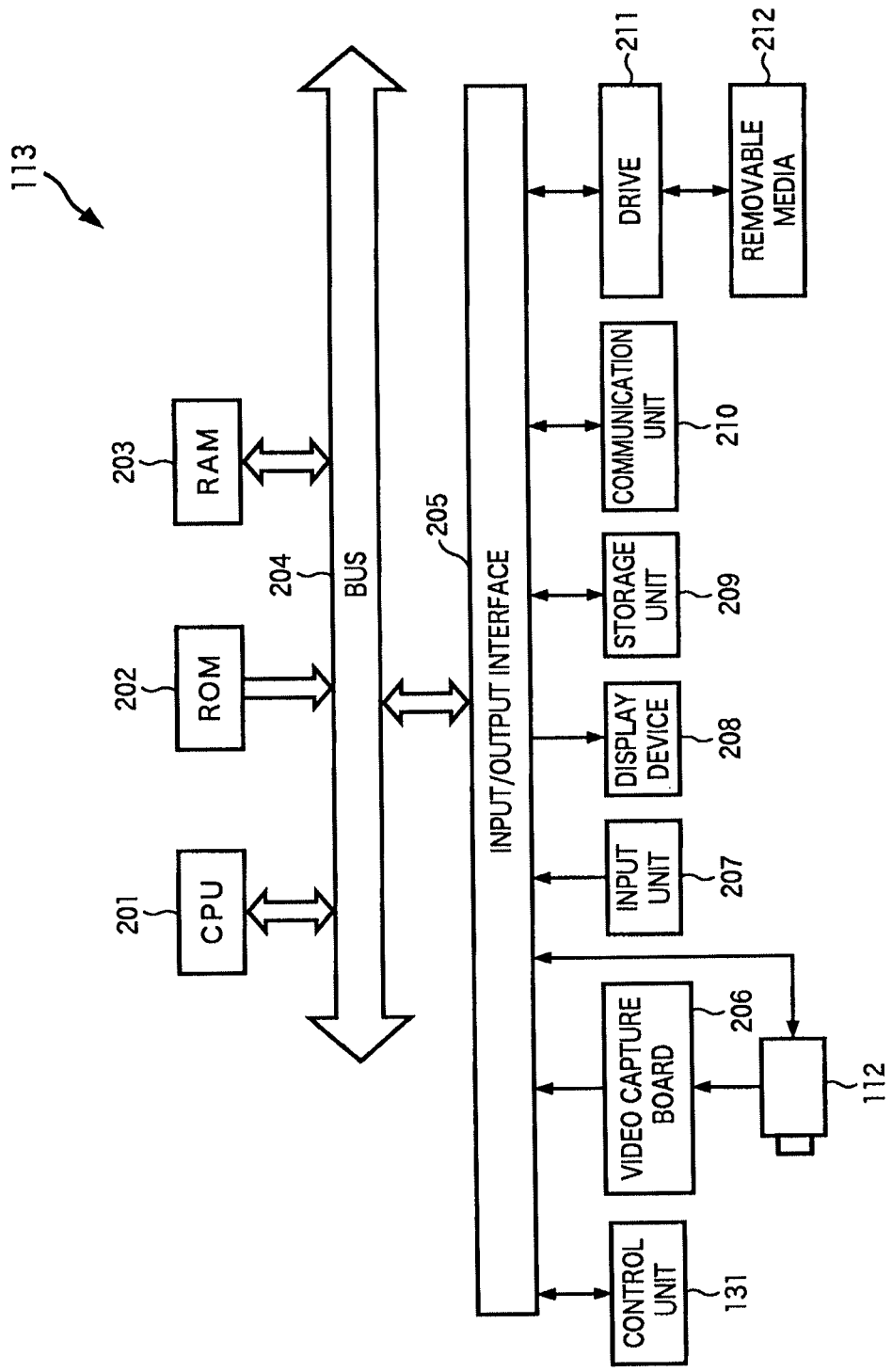
FIG. 2 is a block diagram depicting an embodiment of the computer in FIG. 1.

FIG. 2 is a block diagram depicting a configuration example of hardware of the computer 113 in FIG. 1.

In the computer 113, a CPU (Central Processing Unit) 201, ROM (Read Only Memory) 202 and RAM (Random Access Memory) 203 are inter-connected via a bus 204.

In the bus 204, an input/output interface 205 is also connected. To the input/output interface 205, a control unit 131 of the inverted microscope 111, a camera 112, a video capture board 206 for acquiring a sample image captured by the camera 112, an input unit 207 such as a keyboard, mouse and microphone, a display device 208 such as a display and speaker, a storage unit 209 such as a hard disk and non-volatile memory, a communication unit 210 such as a network interface, and a drive 211 for driving a removable media 212 such as a magnetic disk, optical disk, magneto-optical disk or semiconductor memory, are connected.

In the computer 113, a series of processings are performed by the CPU 201 loading programs stored in the storage unit 209 to the RAM 203 via the input/output interface 205 and bus 204, and executing the programs, for example.

A program executed by the CPU 201 is recorded in, for example, a removable media 212, that is a package media such as a magnetic disk (including a flexible disk), optical disk (e.g. CD-ROM (Compact Disc Read Only Memory), DVD (Digital Versatile Disc)), magneto-optical disk and semiconductor memory, or is provided via a cable or wireless transmission media, such as a local area network, Internet and digital satellite broadcast.

A program can be installed in the storage unit 209 via the input/output interface 205 by inserting the removable media 212 into the drive 211. A program can also be installed in the storage unit 209 by being received by the communication unit 210 via a cable or wireless transmission media. And a program may be installed in advance in the ROM 202 or storage unit 209.

Each component in the computer 113 can transmit/receive information to/from one another via the bus 204 and the input/output interface 205, however an explanation on the bus 204 and the input/output interface 205 is omitted here to simplify description.

Figure 3:
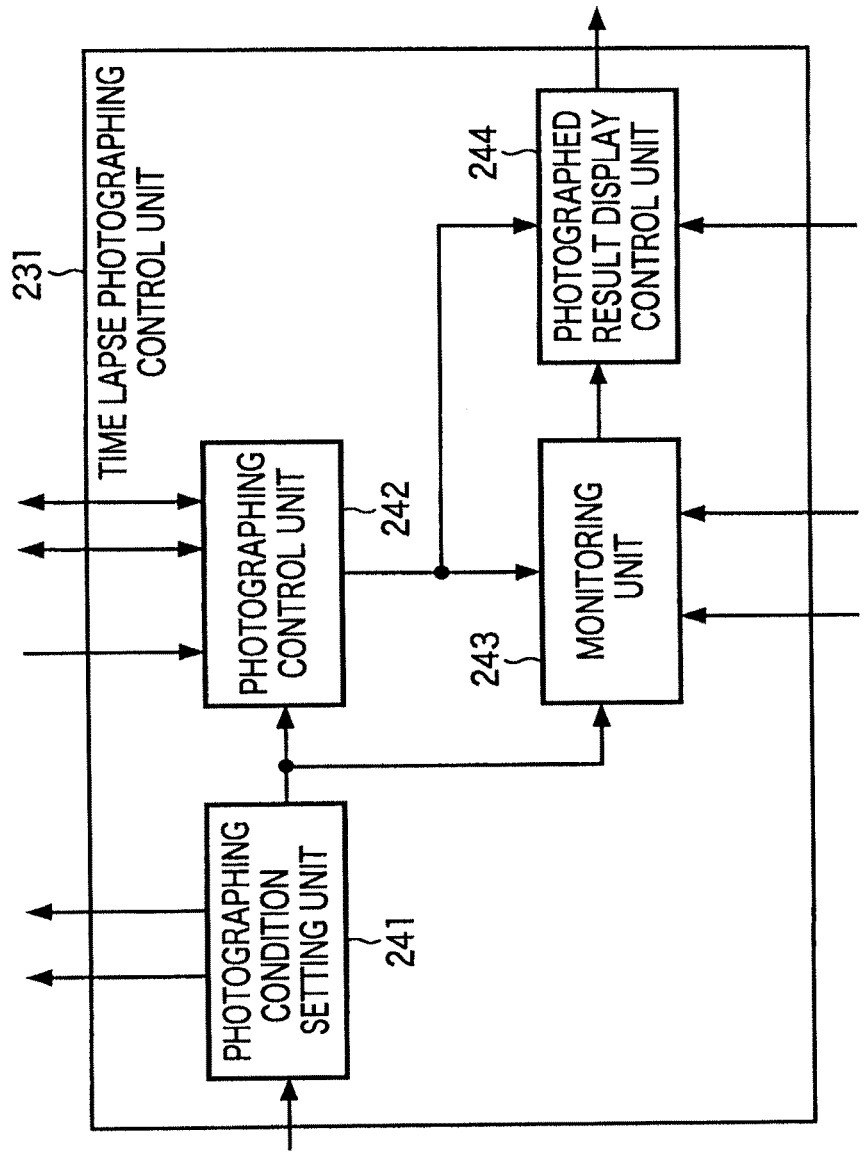
FIG. 3 is a block diagram depicting a functional configuration of a time lapse photographing control unit.

FIG. 3 is a block diagram depicting an example of a configuration of the functions of the time lapse photographing control unit 231, which are implemented by the CPU 201 of the computer 113 in FIG. 2 executing predetermined programs. The time lapse photographing control unit 231 includes the photographing condition setting unit 241, photographing control unit 242, monitoring unit 243 and photographed result display control unit 244.

The photographing condition setting unit 241 displays the setting screen on the display device 208 based on the instructions input by the user via the input unit 207. The photographing condition setting unit 241 acquires the photographing conditions that are set by the user via the input unit 207 from the input unit 207. The photographing condition setting unit 241 supplies the acquired photographing conditions to the photographing control unit 242 and the monitoring unit 243, or stores the conditions in the storage unit 209.

The photographing control unit 242 controls the time lapse photography using the inverted microscope 111 and the camera 112 based on instructions input by the user via the input unit 207. For example, the photographing control unit 242 supplies various control signals, such as a control signal for instructing positions of the electric stage 133, electric revolver 144 or the like, a control signal for instructing switching the fluorescent filter block, a control signal for instructing switching of illumination, a control signal for instructing switching of the camera 112, and a control signal for instructing photographing the sample image, to the control unit 131 of the inverted microscope 111 and the camera 112, and controls the operation of the inverted microscope 111 and the camera 112, so that the time lapse photography is executed according to the photographing conditions set by the user.

The photographing control unit 242 notifies the later mentioned test mode, and the start and end of the time lapse photography, to the monitoring unit 243 and the photographed result display control unit 244. The photographing control unit 242 acquires the information to indicate the state of each device of the inverted microscope 111 from the control unit 131 of the inverted microscope 111. The photographing control unit 242 also acquires information to indicate the state of the camera 112 from the camera 112.

The monitoring unit 243 acquires information to indicate the state of each device of the inverted microscope 111 from the control unit 131 of the inverted microscope 111. The monitoring unit 243 also acquires information to indicate the state of the camera 112 from the camera 112. The monitoring unit 243 monitors the state of operation of the time lapse photography based on the information acquired from the control unit 131 and the camera 112, and supplies the monitoring result to the photographed result display control unit 244.

The photographed result display control unit 244 controls display of the photographed result on the display device 208, including the monitoring result by the monitoring unit 243 and the sample image captured by the camera 112, according to the instructions input by the user via the input unit 207.

Figure 4:
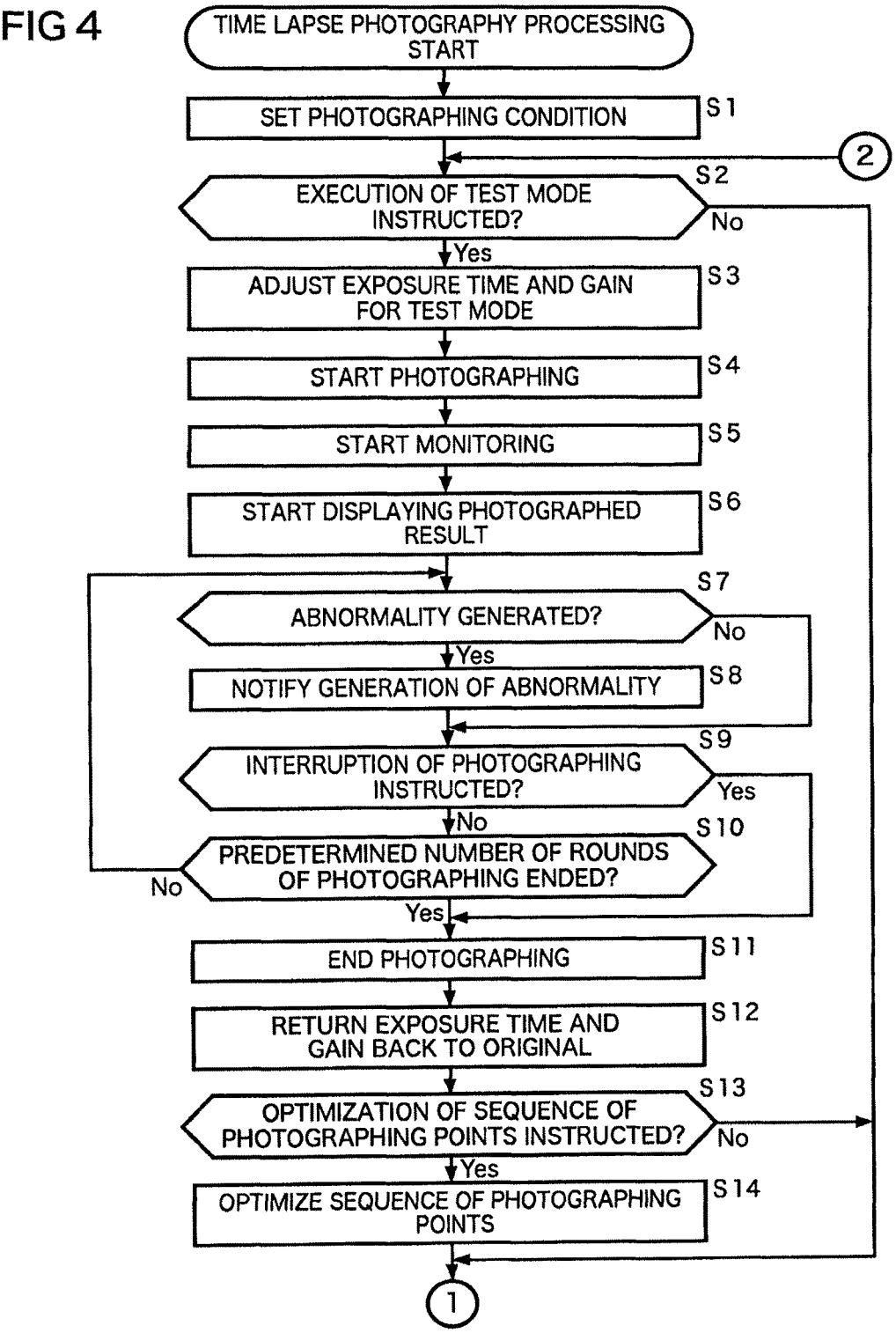
FIG. 4 is a flow chart depicting a time lapse photographing processing.
Figure 5:
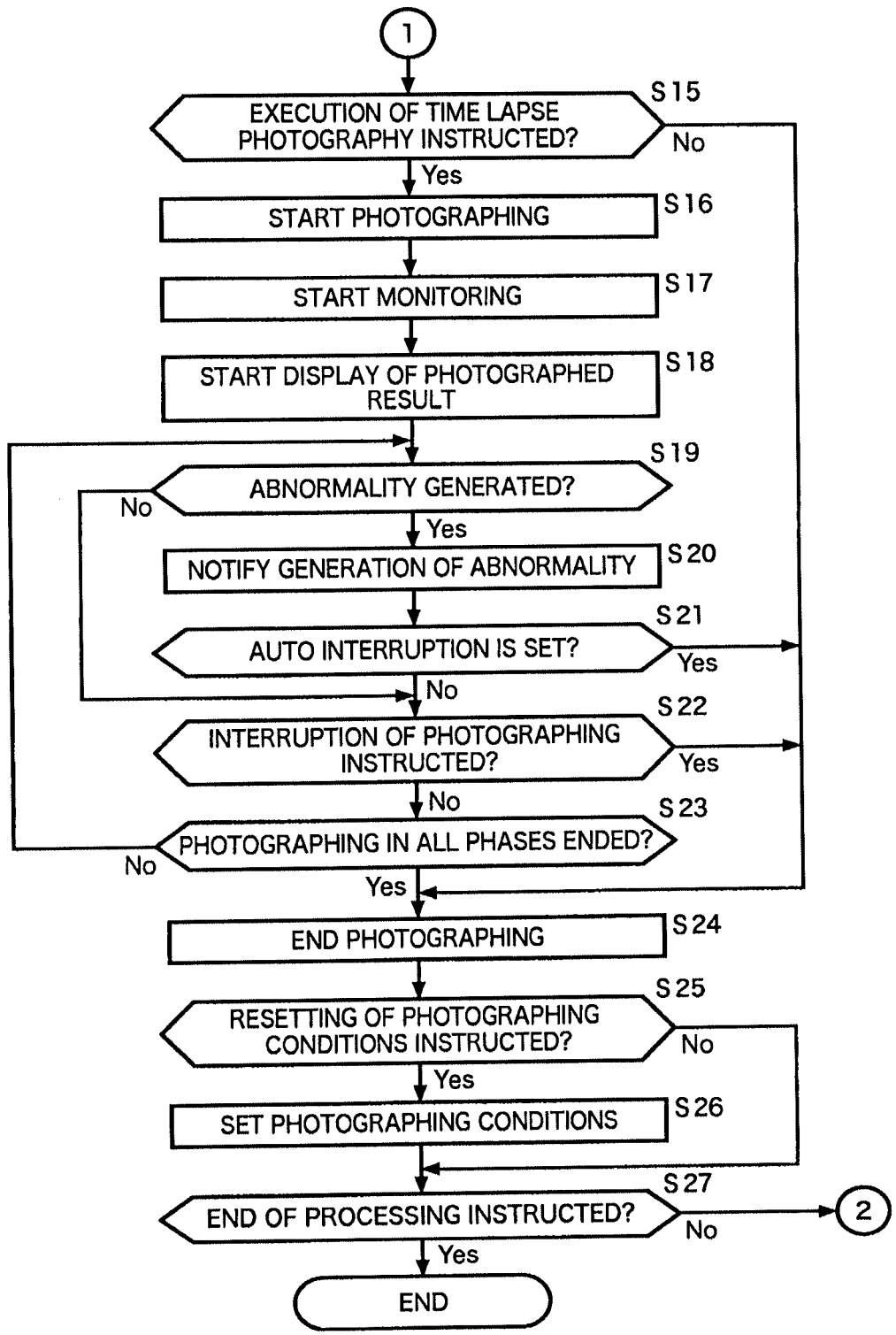
FIG. 5 is a flow chart depicting a time lapse photographing processing.

Now the time lapse photographing processing that is executed by the time lapse photography experiment system 1 will be described with reference to the flow chart in FIG. 4 and FIG. 5. This processing is started, for example, when the user inputs an instruction to start the time lapse photographing processing via the input unit 207 of the computer 113.

In step S1, the photographing condition setting unit 241 sets the photographing conditions. In concrete terms, the photographing condition setting unit 241 displays one of the setting screens shown in FIG. 6, FIG. 8, FIG. 9 and FIG. 11 on the display device 208 of the computer 113 based on the instruction input by the user via the input unit 207.

Figures 6, 7:
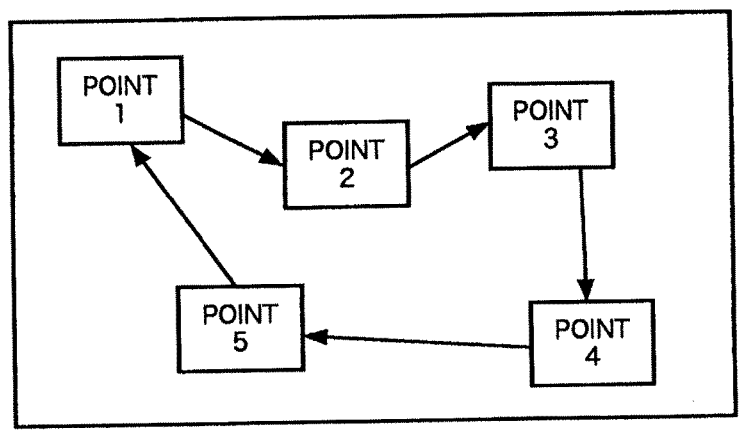
FIG. 6 shows an example of a photographing point setting screen.
FIG. 7 is a diagram depicting a photographing point setting method.

FIG. 6 shows an example of the photographing point setting screen for setting photographing points for photographing the sample 103. A window 311 to indicate a position of the current photographing point, a register button 312 and a window 313 to indicate photographing points which have been registered thus far are displayed on the photographing point setting screen 301 in FIG. 6. A position of a photographing point to be displayed on the photographing point setting screen 301 is displayed by a position on the X axis and Y axis directions of the electric stage 133, and a position in the Z axis direction of the electric revolver 144.

A concrete example of a method for setting photographing points will now be described with reference to FIG. 6 and FIG. 7. In FIG. 7, the outer frame indicates a range on an electric stage 133 (on the XY plane) where the camera 112 can photograph, and point 1 to point 5 show an example of photographing points to be registered.

For example, the user manipulates the operation unit 132 of the inverted microscope 111, and adjusts the positions of the electric stage 133 in the X axis and Y axis directions and the position of the electric revolver 144 in the Z axis direction, so that point 1 can be photographed. The control unit 131 of the inverted microscope 111 supplies information on the current positions of the electric stage 133 in the X axis and Y axis directions and the current position of the electric revolver 144 in the Z axis direction to the photographing condition setting unit 241 of the computer 113. The photographing condition setting unit 241 displays the current positions of the electric stage 133 in the X axis and Y axis directions and the current position of the electric revolver 144 in the Z axis direction, that is the current position of the photographing point, in the window 311. When the user presses the register button 312, the position displayed in the window 311 is registered as a new photographing point, and the position of the registered photographing point is additionally displayed in the window 313. The user repeats the operation of shifting the electric stage 133 and the electric revolver 144 to each photographing point, and then presses the register button 312, whereby photographing points 1 to 5 are registered.

In the photographing point setting screen 301, a photographing point may be registered or changed by directly inputting the positions in the X axis, Y axis and Z axis directions in the window 313.

FIG. 8 shows an example of an observation condition setting screen for setting observation conditions. A window 331 to indicate a state of the current observation condition, a register button 332 and a window 333 to indicate observation conditions which have been registered thus far, are displayed on the observation condition setting screen 321 in FIG. 8. The observation condition is a condition to photograph the sample 103 at each photographing point. In concrete terms, the observation condition is displayed by a combination of a type of camera 112 and a fluorescent filter block to be used for photographing, and a type of illumination to illuminate the sample 103.

For example, the user manipulates the operation unit 132 of the inverted microscope 111, and selects the type of fluorescent filter block, illumination and camera 112 to be used for observing the sample 103. The control unit 131 of the inverted microscope 111 supplies information to indicate the currently selected type of fluorescent filter block, illumination and camera 112 to the photographing condition setting unit 241 of the computer 113. The photographing condition setting unit 241 displays the currently selected type of fluorescent filter block, illumination and camera 112 in the window 331. When the user presses the register button 332, the combination of fluorescent filter block, illumination and camera 112 displayed in the window 331 is registered as a new observation condition, and the registered observation condition is additionally displayed in the window 333.

Each observation condition may be referred to as a "channel" herein below. In the example in FIG. 8, the observation conditions of channel 1 to channel 3 are registered. In concrete terms, in the photographing in channel 1, a UV filter, fluorescent illumination and camera A are used, in the photographing in channel 2, a G filter, fluorescent illumination and camera A are used, and in the photographing in channel 3, a fluorescent filter block is not used, but the transmitted illumination and camera B are used.

FIG. 9 shows an example of a shift sequence setting screen to set the shift sequence. In the shift sequence setting screen 341 in FIG. 9, a window 351, to indicate a shift sequence that is set, is displayed. A shift sequence is for specifying the operation content and operation condition of each device of the inverted microscope 111, which operates when shifting from one observation point to the next observation point. In the device column in the window 351, a type of target device is shown, in the operation column, the operation content of each device is shown, and in the condition column, the operation condition of each device is shown.

In the case of the shift sequence shown in FIG. 9, when the observation point is shifted to the next one, the electric stage 133 (XY in FIG. 9) shifts in the X axis and Y axis directions, the electric revolver 144 (Z in FIG. 9) shifts in the Z axis direction, and the filter is selected by rotating the fluorescent filter block. After the shift of the electric stage 133 and the electric revolver 144 completes, auto focus (AF) is executed. Finally illumination is switched after all operations complete.

After the shift of the electric stage 133 and the electric revolver 144 completes, the auto focus (AF) is executed, whereby the generation of the following phenomena is suppressed. In other words, if auto focus is executed during the shift of the electric stage 133 and the electric revolver 144, that is if the sample 103B in the well 102B is photographed after photographing the sample 103A in the well 102A of the well plate 102, for example, as shown in FIG. 10, auto focus may complete at a point between the well 102A and the well 102B, as shown by the dotted line in the figure during the shift of the electric stage 133, which is not illustrated, and the sample 103B may deviate from the focal plane of the objective lens 139a.

Figure 10:
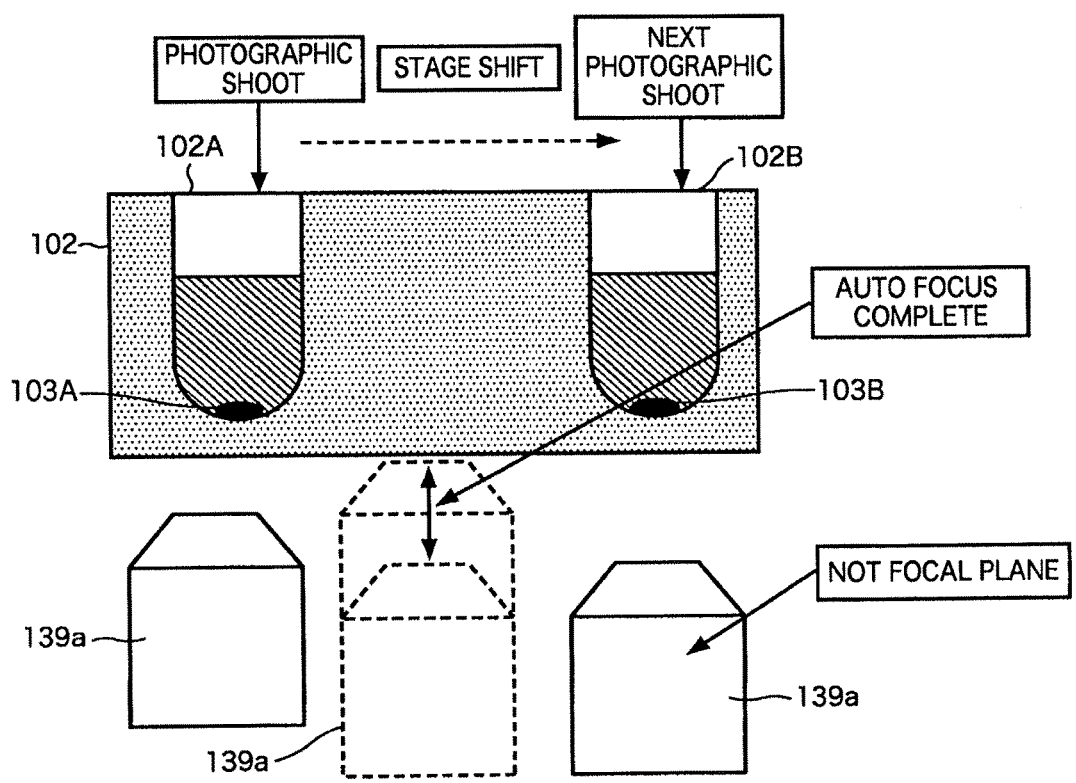
FIG. 10 is a diagram depicting a problem that occurs during time lapse photography.

For simplicity, FIG. 10 shows the shift of the objective lens 139a in the lateral direction with respect to the well plate 102, however in reality the well plate 102 (electric stage 133) shifts in the lateral direction with respect to the objective lens 139a.

Figure 11:
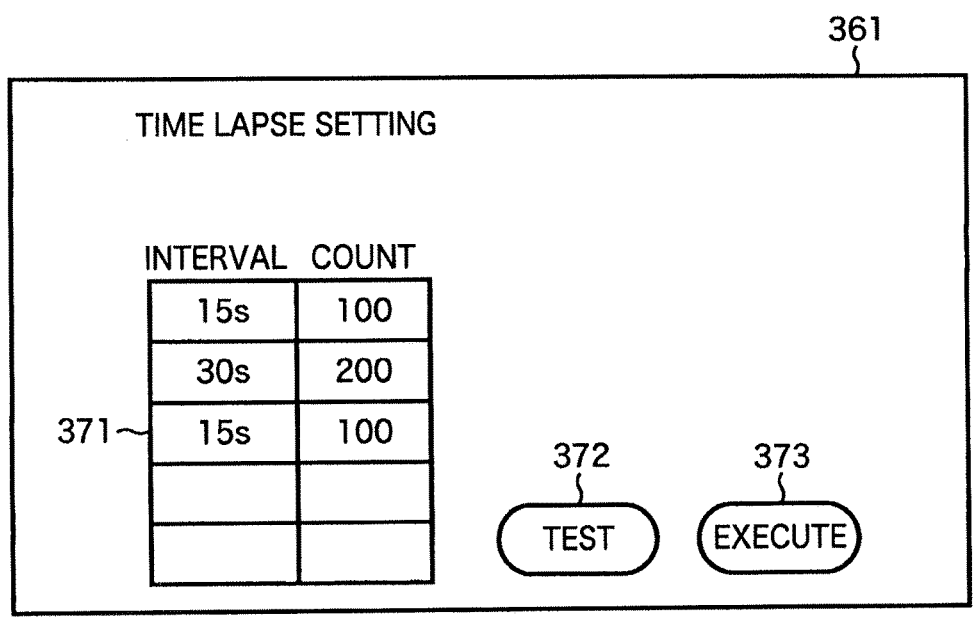
FIG. 11 shows an example of a time lapse setting screen.

FIG. 11 shows an example of the time lapse setting screen used for the time lapse setting. In the time lapse setting screen 361 in FIG. 11, a window 371 to indicate the time lapse conditions being set, a test button 372 which is pressed when the test mode is executed, and an execute button 373 which is pressed when the time lapse photography is executed are displayed.

The time lapse setting is for specifying a round interval and the number of times of photographing shots in each phase. For example, in the case of the example in FIG. 11, one round of photographing is executed for 100 times (100 rounds) with a 15 second interval in the first phase, one round of photographing is executed for 200 times (200 rounds) with a 30 second interval in the second phase, and one round of photographing is executed for 100 times (100 rounds) with a 15 second interval in the third phase.

One round of photography means executing photography of all the channels at all photographing points for one cycle according to the sequence that is set. And the test mode means a mode in which a predetermined number of rounds of time lapse photography are executed as a test.

From the input unit 207, the photographing condition setting unit 241 acquires the photographing conditions, which the user set via the input unit 207, while checking the setting screen that is displayed on the display device 208. The photographing condition setting unit 241 supplies the acquired photographing conditions to the photographing control unit 242 and monitoring unit 243, or stores it in the storage unit 209.

In step S2, the photographing control unit 242 determines whether execution of the test mode was instructed. For example, if an instruction to execute the test mode is input by pressing the test button 372 when the time lapse setting screen 361 in FIG. 11 is being displayed, and this instruction is supplied from the input unit 207 to the photographing control unit 242, the photographing control unit 242 determines that the execution of the test mode was instructed, and processing advances to step S3.

In step S3, the photographing control unit 242 adjusts the exposure time and gain to be those for the test mode. In concrete terms, the photographing control unit 242 sets the gain of the camera 112 to the maximum value Gmax in the range where signals and noise can be distinguished. The photographing control unit 242 also sets the exposure time of the camera 112 to be shorter according to the value of the gain that is set.

The brightness of the sample image that is photographed by the camera 112 is expressed by a product of the exposure time and gain. The exposure time Ttest in the test mode is set to a value given by the following expression (1), where Ttest denotes the exposure time of the camera 112 in the test mode, Gn denotes a gain of the camera 112 in the actual time lapse photography (hereafter may be called "normal mode"), and Tn denotes exposure time.

$$T\text{test} = Tn \times Gn/G\text{max} \quad (1)$$

Thereby an image having substantially the same brightness as the normal mode can be photographed in the test mode, while keeping the exposure time short, and therefore an image in a state similar to the normal mode can be confirmed.

If the intensity of illumination to be irradiated is the same, the sample 103 fades in proportion to the irradiation time. The fading of the sample 103 can therefore be suppressed by setting the exposure time of the camera 112 to be short in the test mode, so as to decrease the irradiation time of illumination. The time to wait for recovery of a faded sample 103 can also be decreased when the test mode shifts to the normal mode.

In step S4, the time lapse photography experiment system 101 starts photography. In concrete terms, the photographing control unit 242 starts supplying various control signals to the control unit 131 of the inverted microscope 111 and the camera 112, so that the time lapse photography is executed according to the photographing conditions which are set by the user. The control unit 131 starts controlling each device of the inverted microscope 111 based on the acquired control signal, so that time lapse photography is executed according to the photographing conditions that are set. The camera 112 starts processing to photograph the sample 103 based on the acquired control signal. The photographing control unit 242 notifies the start of the test mode to the monitoring unit 243 and the photographed result display control unit 244.

In step S5, the monitoring unit 243 starts monitoring. In concrete terms, the control unit 131 of the inverted microscope 111 acquires information to indicate the state of each device of the inverted microscope 111, and supplies it to the photographing control unit 242 and the monitoring unit 243. The camera 112 acquires information to indicate the state of the camera 112, and supplies it to the photographing control unit 242 and the monitoring unit 243. The monitoring unit 243 starts monitoring the operation state of the time lapse photography based on the information from the camera 112 and the control unit 131. In other words, the monitoring unit 243 starts monitoring whether the time lapse photography is being executed according to the photographing conditions that are set. The monitoring unit 243 also supplies the monitoring result to the photographed result display control unit 244.

Figure 12:
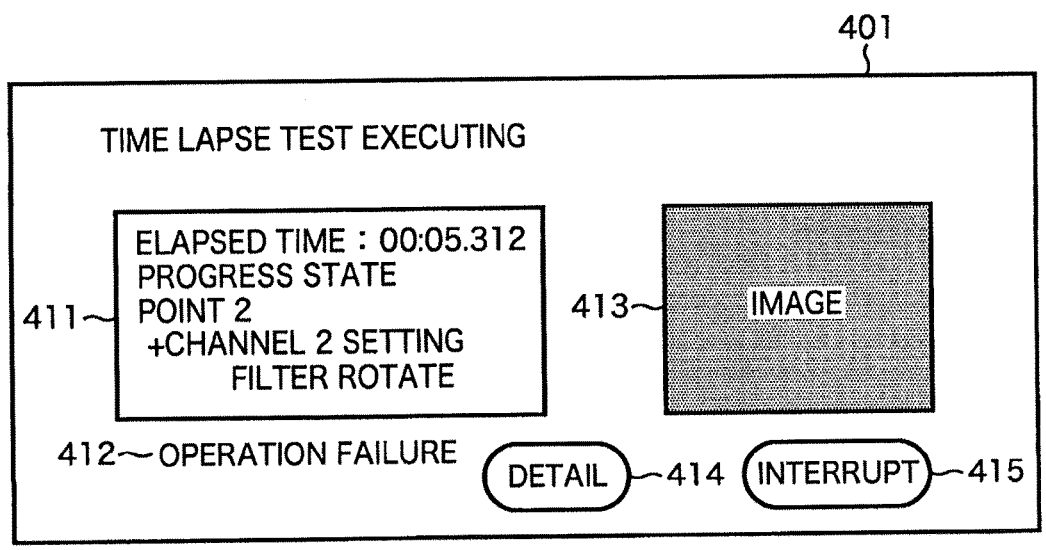
FIG. 12 shows an example of a screen displaying a photographed result of time lapse photography.
Figure 13:
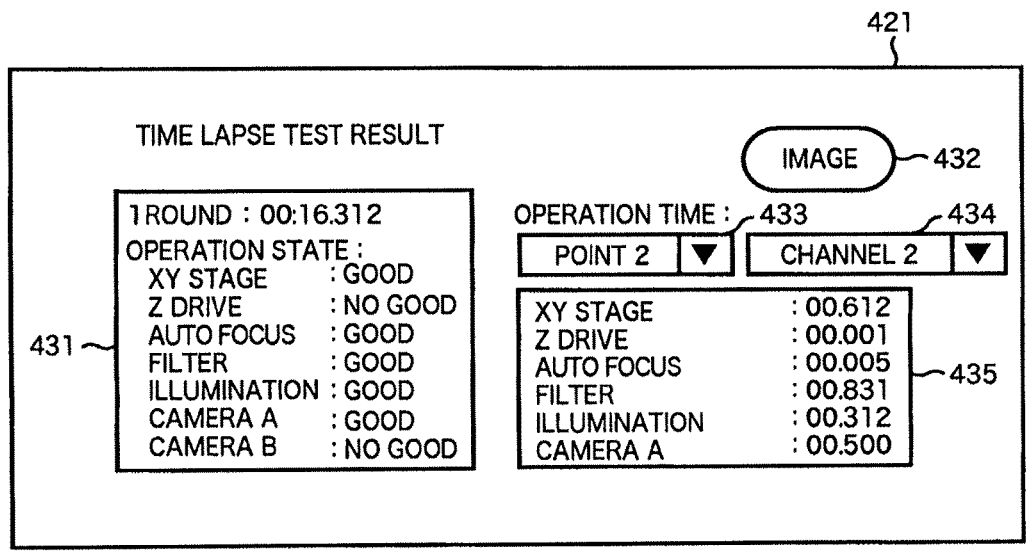
FIG. 13 shows an example of a screen displaying a photographed result of time lapse photography.
Figure 14:
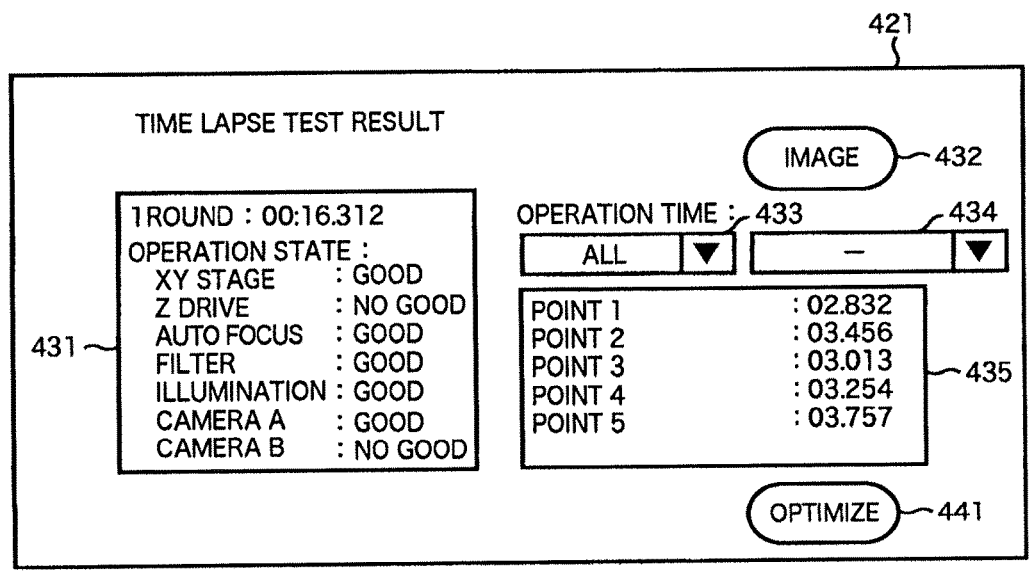
FIG. 14 shows an example of a screen displaying a photographed result of time lapse photography.

In step S6, the display device 208 starts displaying the photographed result. In concrete terms, the camera 112 supplies the photographed sample image to the video capture board 206. The video capture board 206 supplies the sampled image to the photographed result display control unit 244. The photographed result display control unit 244 controls the display device 208 according to the instructions that are input by the user via the input unit 207, and starts displaying the monitoring result by the monitoring unit 243 and the photographed result, including the sample image photographed by the camera 112. FIG. 12 to FIG. 14 show an example of the photographed result display screen.

A window 411, determination result 412, image 413, detail button 414 which is pressed to display a more detailed photographed result, and interrupt button 415 which is pressed to interrupt the time lapse photography are displayed on the photographed result display screen 401 in FIG. 12.

The elapsed time from the start of the processing on the current photographing point to now, and the progress state of the current processing are displayed in the window 411. For the progress state of the current processing, a photographing point, that is the current photographing target, and the current operation state are displayed. In the case of FIG. 12, for example, the current progress state is displayed, in that the current photographing target is the photographing point 2, channel 2 is currently being set, and in concrete terms a fluorescent filter block is being rotated.

The determination result 412 indicates whether the time lapse photography operation is normal or not, and if normal, the phrase "operation normal" is displayed, and if not, the phrase "operation failure" is displayed.

The latest sample image is displayed in the image 413.

If the detail button 414 is pressed when the photographed result display screen 401 is being displayed, the photographed result display screen 421 in FIG. 13 is displayed. For example, in the photographed result display screen 421, details on the photographed result of the round being executed are displayed if the time lapse photography is being executed, and details on the photographed result of the round executed last are displayed if the time lapse photography is completed. A number of a round of which details of the photographed result are displayed may be selected.

A window 431, image button 432 which is pressed to return to the photographed result display screen 401, list box 433, list box 434 and window 435 are displayed on the photographed result display screen 421 in FIG. 13.

A number of the display target round, the time required for processing of the round (in the case of a round currently being executed, the elapsed time from start of processing to now), and the state of the operation of each device of the inverted microscope 111 and the camera 112 are displayed in the window 431. In the case of the example in FIG. 13, it is shown that the display target is the first round and the processing of the first round took 16.312 seconds. It is also shown that in the processing of the first round, the operations of the XY stage (electric stage 133 and stage drive mechanism 134), auto focus, fluorescent filter block, illumination and camera A are good, and an operation failure is being generated in the Z drive (piezo element 145, frame 146, motor control unit 147, focusing motor 148 and piezo control unit 149) and camera B.

The list box 433 and the list box 434 are for selecting information to be displayed in the window 435. In concrete terms, the individual operation time of each device of the inverted microscope 111 and the camera 112, from the start of processing a photographing point selected in the list box 433 to completion of photographing in the channel selected in the list box 434, is displayed in the window 435. For example, in the window 435 in FIG. 13, it is shown that the operation time, from the start of processing on the photographing point 2 in the first round to the completion of photographing in the channel 2 of the photographing point 2 is 0.612 seconds for the XY stage, 0.001 seconds for the Z drive, 0.005 seconds for auto focus, 0.831 seconds for the fluorescent filter block, 0.312 seconds for illumination, and 0.500 seconds for camera A.

As FIG. 14 shows, if "all" is selected in the list box 433, no value is set in the list box 434, and the time required for photographing each photographing point in the display target round is displayed in the window 435. In the case of the example in FIG. 14, it is shown that the time required for photographing each photographing point was photographing point 1 is 2.832 seconds, photographing point 2 is 3.456 seconds, photographing point 3 is 3.013 seconds, photographing point 4 is 3.254 seconds, and photographing point 5 is 3.757 seconds. If the time required for processing one round is longer than the round interval that is set, the optimize button 441, to prompt executing optimization of the sequence of the photographing points, is displayed. The optimization processing of the sequence of the photographing points will be described in detail later.

In step S7, the photographed result display control unit 244 determines whether an abnormality occurred based on the monitoring result by the monitoring unit 243, and if it is determined that an abnormality occurred, processing advances to step S8.

In step S8, the photographed result display control unit 244 notifies the generation of an abnormality. For example, as FIG. 12 shows, the photographed result display control unit 244 displays the phrase "operation failure" on the determination result 412 on the photographed result display screen 401, or displays the phrase "failure" in the column of the device in which an abnormality is generated, in the window 431 of the photographed result notification screen 421 in FIG. 13 and FIG. 14.

A screen for notifying the generation of an abnormality, for example, may be displayed, or the generation of an abnormality may be notified using a voice message or alarm sound. Not only to notify the generation of an abnormality, but an image and message, to prompt checking the operation of each device or to change the photographing conditions, may be displayed, or a voice message may be output.

Processing then advances to step S9.

If it is determined that an abnormality was not generated in step S7, on the other hand, the processing in step S8 is skipped, and processing advances to step S9.

In step S9, the photographing control unit 242 determines whether the interruption of photography was instructed. If it is determined that interruption of photography was not instructed, processing advances to step S10.

In step S10, the photographing control unit 242 determines whether photographing a predetermined number of rounds ended. If it is determined that a predetermined number of rounds (e.g. one round) that is set to be executed in the test mode has not ended, processing returns to step S7, and it is determined whether an interruption of photography was instructed in step S9, or processing from steps S7 to S10 are repeatedly executed until it is determined that photographing a predetermined number of rounds ended in step S10.

If it is determined that photographing a predetermined number of rounds ended in step S10, processing advances to step S11.

In step S9, if an instruction to interrupt photographing is input by pressing the interrupt button 415 when the photographed result display screen 401 in FIG. 12 is being displayed, and this instruction is supplied from the input unit 207 to the photographing control unit 242, the photographing control unit 242 determines that an interruption of photography was instructed, the processing in step S10 is skipped, and processing advances to step S11.

In step S11, the time lapse photography experiment system 101 ends photography. In concrete terms, the photographing control unit 242 instructs the control unit 131 of the inverted microscope 111 and the camera 112 to end the time lapse photography. The control unit 131 ends the processing of each device of the inverted microscope 111. The camera 112 ends photographing the sample 103. And the photographing control unit 242 notifies the end of the test mode to the monitoring unit 243 and the photographed result display control unit 244.

In step S12, the photographing control unit 242 returns the exposure time and gain back to the original state. In other words, the photographing control unit 242 returns the exposure time and gain of the camera 112, changed in the processing in step S3, back to the values before the change.

In step S13, the photographing condition setting unit 241 determines whether optimization of the sequence of the photographing points was instructed. For example, if the instruction to execute optimization of the sequence of the photographing points is input, by pressing the optimize button 441, for example, when the photographed result display screen 421 in FIG. 14 is being displayed, and this instruction is supplied from the input unit 207 to the photographing condition setting unit 241, the photographing condition setting unit 241 determines that the optimization of the sequence of the photographing points was instructed, and processing advances to step S14.

In step S14, the photographing condition setting unit 241 optimizes the condition of the photographing points. In concrete terms, the photographing condition setting unit 241 changes the sequence of the photographing points so that the time required for one round becomes the shortest, considering the distance between the photographing points and the observation conditions of each channel. The photographing condition setting unit 241 displays an optimized result screen, which indicates the result of optimizing the sequence of the photographing points on the display device 208.

Figure 15:
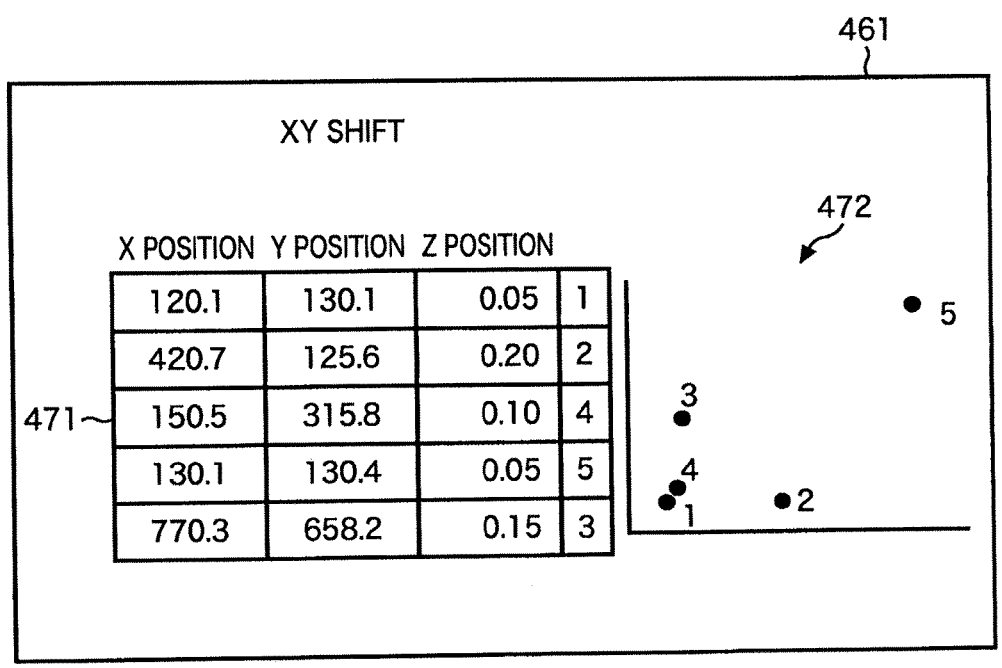
FIG. 15 shows an example of a photographing point optimization result screen.

FIG. 15 shows an example of the optimized result screen. A table 471 and graph 472 are displayed in the optimized result screen 461 in FIG. 15. The table 471 shows the positions of the photographing points in the X axis, Y axis and Z axis in the sequence after optimization from the top. The graph 472 shows a positional relationship of each photographing point on the plane of the X axis and Y axis. The numbers at the right of the table 471 and the number in each photographing point in the graph 472 indicate(s) a sequence of photographing points before optimization.

Processing then advances to step S15.

If it is determined that optimization of the sequence of the photographing points was not instructed in step S13, processing in step S14 is skipped, and processing advances to step S15.

If it is determined that execution of the test mode was not instructed in step S2, the processings in steps S3 to S14 are skipped, and processing advances to step S15.

In step S15, the photographing control unit 242 determines whether execution of the time lapse photography was instructed. For example, if an instruction to execute the time lapse photography is input by pressing the execute button 373 when the time lapse setting screen 361 in FIG. 11 is being displayed, and this instruction is supplied from the input unit 207 to the photographing control unit 242, the photographing control unit 242 determines that execution of the time lapse photography was instructed, and processing advances to step S16.

In step S16, photography is started similarly to the processing in step S4. The photographing control unit 242 notifies the start of time lapse photography to the monitoring unit 243 and the photographed result display control unit 244.

In step S17, monitoring is started similarly to the processing in step S5, and in step S18, display of the photographed result is started similarly to the processing in step S6. In this case, the phrase "time lapse photography", for example, is displayed, instead of the phrase "time lapse test", on the above mentioned screens in FIG. 12 to FIG. 14.

In step S19, it is determined whether an abnormality was generated similarly to step S7, and if it is determined that an abnormality was generated, processing advances to step S20, and in step S20, the generation of an abnormality is notified, similarly to the processing in step S8.

The photographing control unit 242 determines if automatic interruption is set in step S21. If it is determined that automatic interruption is not set, processing advances to step S22.

If it is determined that an abnormality was not generated in step S19, the processings in step S20 and S21 are skipped, and processing advances to step S22.

In step S22, it is determined whether an interruption of photography was instructed, similarly to the processing in step S9, and processing advances to step S23 if it is determined that an interruption of photography was not instructed.

In step S23, the photographing control unit 242 determines whether photography in all phases ended. If it is determined that photography in all phases did not end, processing returns to step S19, and the processings in steps S19 to S23 are repeatedly executed until it is determined that automatic interruption is set in step S21, or it is determined that interruption of photography was instructed in step S22, or it is determined that photography for all phases ended in step S21.

If it is determined that photography in all phases ended in step S23, on the other hand, processing advances to step S24.

If it is determined that interruption of photography was instructed in step S22, processing in step S23 is skipped, and processing advances to step S24.

If it is determined that automatic interruption is set in step S21, processings in steps S22 and S23 are skipped, and processing advances to step S24.

In step S24, photography is ended, similarly to step S11. The photographing control unit 242 notifies the end of time lapse photography to the monitoring unit 243 and the photographed result display control unit 244.

In step S25, the photography condition setting unit 241 determines whether resetting of the photographing conditions was instructed. For example, the user inputs the instruction to reset the photographing conditions via the input unit 207, and if this instruction is supplied from the input unit 207 to the photographing condition setting unit 241, the photographing condition setting unit 241 determines that the resetting of the photographing conditions was instructed, and processing advances to step S26.

In step S26, photographing conditions are set by processing similar to step S1, then processing advances to step S27.

If it is determined that resetting of photographing conditions was not instructed in step S25, on the other hand, the processing in step S26 is skipped, and processing advances to step S27.

In step S27, the photographing control unit 242 determines whether the end of processing was instructed. If it is determined that the end of processing was not instructed, processing returns to step S2, and the processings in steps S2 to S27 are repeatedly executed until it is determined that the end of processing was instructed in step S27.

If the user inputs an instruction to end processing via the input unit 207 in step S27, and this instruction is supplied from the input unit 207 to the photographing control unit 242, the photographing control unit 242 determines that the end of processing was instructed, and time lapse photographing processing ends.

In this way, the user can simply confirm whether the time lapse photography is being executed normally. In particular, an apparatus (device) in which an abnormality is generated can be quickly confirmed with certainty by the photographed result display screen 421 in FIG. 13 and FIG. 14. It can also be easily confirmed whether the processing time per round is within a time which is set, and processing which requires time can be easily analyzed.

If automatic interruption is set, the time lapse photography is automatically ended at a point when an abnormality is detected, so an unnecessary continuance of the experiment can be prevented.

Because of the test mode, time lapse photography can be easily tested before executing actual time lapse photography, and an abnormality in an apparatus and in settings can be discovered in advance.

In the time lapse photography experiment system 101, the test mode may be omitted. In this case, actual time lapse photography is executed only for one to several rounds, and is then interrupted as a substitute for test mode.

Configurations and each role of processing of the devices of the time lapse photography experiment system 101 in FIG. 1 are not limited to the above mentioned examples. A part of the processing executed by the computer 113, for example, may be executed by the control unit 131 of the inverted microscope 111, and various devices and functions may be added to the inverted microscope 111, so that all the processing executed by the computer 113 may be executed by the inverted microscope 111. A part related to the time lapse photography may be constructed as a photography device, independent from the inverted microscope, so that the functions of the computer 113 are installed in the photographing device.

The above mentioned series of processings can be executed by hardware, or by software.

The programs executed by the computer 113 may be programs in which processings are performed in a time series according to the sequence described in the present description, or programs of which processings are executed in parallel, or at a required timing when call up is performed.

In the present description, the term "system" refers to a total device constituted by a plurality of devices and means.

Embodiments of the present invention are not limited to the above mentioned embodiments, but can be modified in various ways within the scope not departing from the spirit of the present invention.

The invention claimed is:

1. A photographing control device for controlling time lapse photography using a microscope, comprising:
a photographing control unit to control an operation of each apparatus of said microscope that performs processing related to said time lapse photography, in an execution mode for executing said time lapse photography, and executing at least part of time lapse photography in a test mode for confirming an operation of said time lapse photography before said execution mode, wherein
said photographing control unit controls said operation of each apparatus of said microscope in said execution mode according to information acquired in said test mode.

2. The photographing control device according to claim 1, wherein
an exposure time of said camera in said test mode is shorter than an exposure time of said camera in said execution mode.

3. A microscope that can execute time lapse photography, comprising:
a photographing control unit to control an operation of each apparatus of said microscope that performs processing related to said time lapse photography, in an execution mode for executing said time lapse photography, and executing at least part of time lapse photography in a test mode for confirming an operation of said time lapse photography before said execution mode, wherein
said photographing control unit controls said operation of each apparatus of said microscope in said execution mode according to information acquired in said test mode.

4. A non-transitory computer readable storage medium including a program for causing a computer to execute processing to control time lapse photography using a microscope, the program causing the computer to execute processing comprising:
a photographing control step of controlling an operation of each apparatus of said microscope that performs processing related to said time lapse photography, in an execution mode for executing said time lapse photography, and executing at least part of time lapse photography in a test mode for confirming an operation of said time lapse photography before said execution mode and controlling said operation of each apparatus of said microscope in said execution mode according to information acquired in said test mode.

5. The photographing control device according to claim 1, further comprising
a determination unit to determine whether the operation of at least one of said apparatuses of said microscope is normal or not in said test mode.

6. The photographing control device according to claim 1, wherein
said time lapse photography is photographing images at a predetermined interval.

7. The microscope according to claim 3, further comprising
a determination unit to determine whether the operation of at least one of said apparatuses of said microscope is normal or not in said test mode.

8. The microscope according to claim 3, wherein
said time lapse photography is photographing images at a predetermined interval.

9. The non-transitory computer readable storage medium according to claim 4, the processing further comprising
determining whether the operation of at least one of said apparatuses of said microscope is normal or not in said test mode.

10. The non-transitory computer readable storage medium according to claim 4, wherein
said time lapse photography is photographing images at a predetermined interval.

* * * * *